United States Patent [19]
Zhang et al.

[11] Patent Number: 6,026,878
[45] Date of Patent: *Feb. 22, 2000

[54] INEXTENSIBLE HIGH TEMPERATURE RESISTANT TIRE

[75] Inventors: Zhibin Zhang, Stow; Thomas Reed Oare, Suffield; Amit Prakash, Hudson, all of Ohio

[73] Assignee: The Goodyear Tire & Rubber Company, Akron, Ohio

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/865,448

[22] Filed: May 29, 1997

[51] Int. Cl.⁷ .............. B60C 9/04; B60C 13/00; B60C 15/00; B60C 17/00
[52] U.S. Cl. .......... 152/454; 152/517; 152/540; 152/541; 152/554; 152/555; 152/556
[58] Field of Search .................. 152/517, 555, 152/554, 556, 454, 525, 540, 541

[56] References Cited

U.S. PATENT DOCUMENTS

| | | |
|---|---|---|
| 3,062,258 | 11/1962 | Maiocchi . |
| 3,625,271 | 12/1971 | Hutch . |
| 3,760,858 | 9/1973 | Grossett . |
| 3,786,851 | 1/1974 | Mirtain et al. . |
| 3,983,919 | 10/1976 | Messerly ................. 152/517 |
| 4,074,743 | 2/1978 | van der Burg et al. . |
| 4,193,437 | 3/1980 | Powell ................... 152/517 |
| 4,202,393 | 5/1980 | Ikeda et al. . |
| 4,244,414 | 1/1981 | Uemura et al. . |
| 4,271,889 | 6/1981 | Pommier . |
| 4,549,593 | 10/1985 | Yahagi et al. . |
| 4,609,023 | 9/1986 | Loser . |
| 4,842,033 | 6/1989 | Nguyen . |
| 5,058,646 | 10/1991 | Kajikawa et al. .......... 152/517 X |
| 5,060,707 | 10/1991 | Sumikawa . |
| 5,234,043 | 8/1993 | Suzuki et al. . |
| 5,238,040 | 8/1993 | Ghilardi . |
| 5,261,474 | 11/1993 | Lobb et al. . |
| 5,299,615 | 4/1994 | Ataka ................... 152/517 X |
| 5,361,820 | 11/1994 | Adachi . |
| 5,368,082 | 11/1994 | Oare et al. . |
| 5,392,830 | 2/1995 | Janello et al. . |
| 5,427,166 | 6/1995 | Willard, Jr. . |
| 5,490,551 | 2/1996 | Prakash et al. ............ 152/556 |
| 5,511,599 | 4/1996 | Willard, Jr. . |
| 5,639,320 | 6/1997 | Oare et al. . |
| 5,795,416 | 8/1998 | Willard, Jr. et al. ....... 152/517 |
| 5,871,602 | 2/1999 | Paonessa et al. .......... 152/517 |

FOREIGN PATENT DOCUMENTS

| | | |
|---|---|---|
| 053522A2 | 6/1982 | European Pat. Off. . |
| 0535938 | 4/1993 | European Pat. Off. . |
| 0545681 | 6/1993 | European Pat. Off. ....... 152/517 |
| 0590482A1 | 4/1994 | European Pat. Off. . |
| 2425334 | 12/1979 | France ................. 152/517 |
| 58-174004 | 10/1983 | Japan . |
| 59-106304 | 6/1984 | Japan ................. 152/517 |

OTHER PUBLICATIONS

Abstract of JP 6–247103 A, Sep. 6, 1994, Matsushima (Toyo Tire & Rubber Co. Ltd.).

*Primary Examiner*—Adrienne C. Johnstone
*Attorney, Agent, or Firm*—David L. King

[57] ABSTRACT

A runflat radial ply passenger or light truck pneumatic tire 10 has a carcass 30 reinforced with at least one sidewall insert or filler 42 and one substantially inextensible cord reinforced ply 38, the ply being wrapped about two bead cores 26 and located radially inward of a belt reinforcing structure 36. The sidewall insert or filler 42 is located radially inward of the ply 38. The cord 43 has a minimum modulus E of 10 Gpa and is generally inextensible and less heat sensitive than conventional synthetic cords used in passenger and light truck tires. In one embodiment the ply cords 43 are aramid in another embodiment the cords 43 are steel

10 Claims, 8 Drawing Sheets

INEXTENSIBLE HIGH TEMPERATURE RESISTANT TIRE

TECHNICAL FIELD

This invention relates to a tire more particularly to a passenger or light truck tire capable of being used in the uninflated condition.

BACKGROUND OF THE INVENTION

Various tire constructions have been suggested for pneumatic runflat tires, that is, tires capable of being used in the uninflated condition. One approach described in U.S. Pat. No. 4,111,249 entitled the "Banded Tire" was to provide a hoop or annular band directly under and approximately as wide as the tread. The hoop in combination with the rest of the tire structure could support the vehicle weight in the uninflated condition. This banded tire actually tensioned the ply cords even in the uninflated condition.

Another approach taken has been to simply strengthen the sidewalls by increasing the cross-sectional thickness thereof. These tires when operated in the uninflated condition place the ply cords and the sidewall in compression. Due to the large amounts of rubber required to stiffen the sidewall members, heat build-up is a major factor in tire failure. This is especially true when the tire is operated for prolonged periods at high speeds in the uninflated condition. Pirelli discloses such a tire in European Pat. Pub. No. 0-475-258A1.

A Goodyear patent having some of the same inventors of the present invention disclosed the first commercially accepted runflat pneumatic radial ply tire, the Eagle GSC-EMT tire. The tire was accepted as an equipment option for the 1994 Corvette automobile. U.S. Pat. No. 5,368,082 teaches the employment of special sidewall inserts to improve stiffness. Approximately six additional pounds of weight per tire was required to support an 800 lb load in this uninflated tire. These runflat tires had a very low aspect ratio. This earlier invention although superior to prior attempts still imposed a weight penalty per tire that could be offset by the elimination of a spare tire and the tire jack. This weight penalty was even more problematic when the engineers attempted to build higher aspect ratio tires for the large luxury touring sedans. The required supported weight for an uninflated luxury car tire approximates 1400 lbs load. These taller sidewalled tires having aspect ratios in the 55% to 65% range or greater means that the working loads were several times that of the earlier 40% aspect ratio runflat Corvette type tires. Such loads meant that the sidewalls and overall tire had to be stiffened to the point of compromising ride. Luxury vehicle owners simply will not sacrifice ride quality for runflat capability. The engineering requirements have been to provide a runflat tire with no loss in ride or performance. In the very stiff suspension performance type vehicle the ability to provide such a tire was comparatively easy when compared to luxury sedans with a softer ride characteristic. Light truck and sport utility vehicles, although not as sensitive to ride performance, provide a runflat tire market that ranges from accepting a stiffer ride to demanding the softer luxury type ride.

An equally important design consideration in the development of a runflat tire is insuring that the uninflated tire remains seated on the rim. Solutions have been developed employing bead restraining devices as well as special rims to accomplish this requirement such as Bridgestone Expedia S-01 Runflat A/M Tire. Alternatively, the Eagle GSC-EMT tire employed a new bead configuration enabling the tire to function on standard rims without requiring additional bead restraining devices.

Two U.S. Pat. Nos., 5,427,166 and 5,511,599 of Walter L Willard, Jr., show Michelin tires that disclose the addition of a third ply and an addition of a third insert in the sidewall to further increase the runflat performance of the tire over the original U.S. Pat. No. 5,368,082 Oare et al. patents. These patents discuss some of the load relations that occur in the uninflated condition of the tire and they demonstrate that the Oare concept can be applied to addition numbers of plies and inserts.

A latter runflat tire attempt is taught in U.S. Pat. No. 5,685,927 which provides a higher aspect ratio tire with the employment of a load supporting bead core placed directly under the tread belt package of the tire. Again, most of the inventors of that concept were part of the original design team of the original Corvette EM tire. Although very promising in load support and ride that approach showed somewhat higher rolling resistance in the normally inflated conditions.

A further latter U.S. Pat. No. 5,535,800 discloses the use of elastomeric covered composite ribs that in combination with a radial ply can provide excellent runflat capability in a wide range of tire applications.

A further latter U.S. Pat. No. 5,535,800 discloses the use of elastomeric, covered composite ribs that in combination with a radial ply can provide excellent runflat capability in a wide range of tire applications.

An object of the present invention was to provide limited runflat mileage of the tire without appreciably increasing the tire's weight, rolling resistance or diminishing the overall ride performance.

In U.S. Pat. No. 5,361,820, a pneumatic radial tire is disclosed that has a shoulder insert and an apex envelope by a single ply that has its turnup extended to end directly under the edge of one belt reinforcement. The tire although not a runflat tire demonstrates that beneficial weight reductions can be achieved with a nominal loss of high performance handling.

The employment of such a structure in a runflat tire has not been applied successfully due to the unique design requirements. The invention disclosed hereinafter teaches a unique way to achieve a runflat tire using a few as one ply and one insert per sidewall while still being able to keep the tire intact during runflat conditions. This enables the tire to be very efficiently produced with a lighter weight and fewer components.

SUMMARY OF THE INVENTION

A tire 10 has a tread 12, a belt structure 36 and a carcass 30 radially inward of the tread 12 and belt structure 36. The carcass 30 has one ply 38 reinforced with cords 43 having a minimum modulus E and a pair of inextensible bead cores 26,26A. The one ply 38 has a pair of turnup ends 32 wrapped around the pair of inextensible bead cores 26 or 26A. The carcass 30 has a pair of sidewall structures 20 in each sidewall structure 20 the carcass 30 has an runflat insert or filler 42 radially inwardly of the ply 38.

The cords 43 of the ply 38 are preferably substantially inextensible and have a minimum modulus of at least 10 GPa. The cords have a diameter of less than 0.75 mm and a filament tensile strength of at least 2000 MPa and a percent elongation of at least 2% or greater. The cord modulus remaining above 10 GPa at temperatures of about 100° C.

Preferably the cords 43 are aramid or metallic, most preferably steel cords. The cords 43 can be selected from a wide range of materials, but preferably the cords 43 are highly flexible with high tensile strength.

In the preferred second embodiment the tire has the turnup ends 32 extending radially outwardly to under the belt structure 36 and in each sidewall there is a second runflat insert filler 46 that is located between the ply 38 and the turnup 32 and which extends from the bead core 26 to under or in proximity to the belt structure 36.

DEFINITIONS

Figure 1:
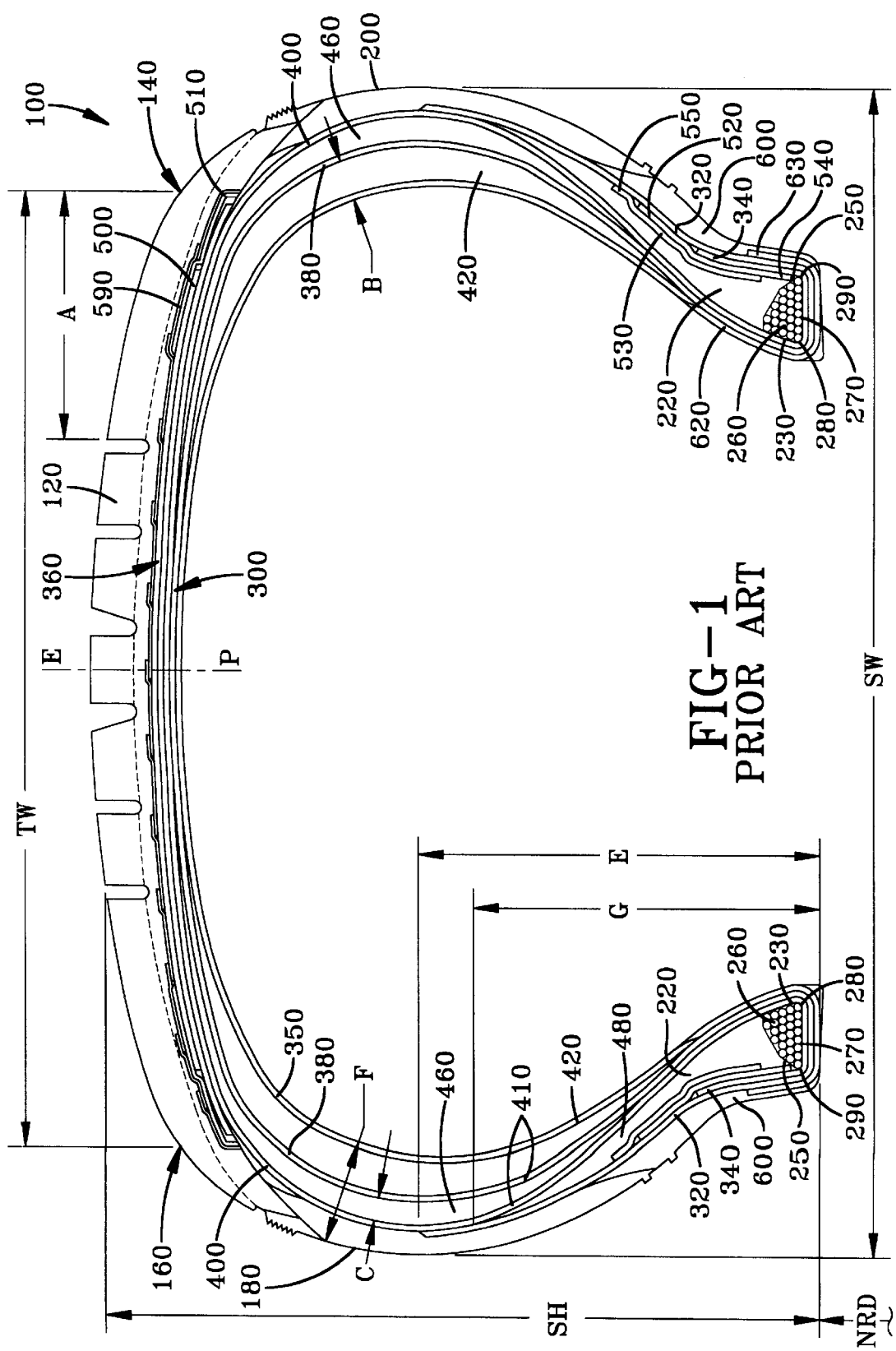
FIG. 1 is a cross-sectional view of a prior art runflat tire made in accordance to the prior art tire 100 disclosed in U.S. Pat. No. 5,368,082.

"Aspect Ratio" means the ratio of its section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Circumferential" means lines or directions extending along the perimeter of the surface of the annular tread perpendicular to the axial direction.

"Carcass" means the tire structure apart from the belt structure, tread, and undertread, but including the beads.

"Casing" means the carcass, belt structure, beads, sidewalls and all other components of the tire excepting the tread and undertread.

"Chafers" refers to narrow strips of material placed around the outside of the bead to protect cord plies from the rim, distribute flexing above the rim.

"Cord" means one of the reinforcement strands of which the plies in the tire are comprised.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Ply" means a layer of rubber-coated parallel cords.

"Radial" and "radially" mean directions radially toward or away from the axis of rotation of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tread Width" means the arc length of the tread surface in the axial direction, that is, in a plane parallel to the axis of rotation of the tire.

DETAILED DESCRIPTION OF THE PREFERRED EMBODIMENT

Figure 3C:
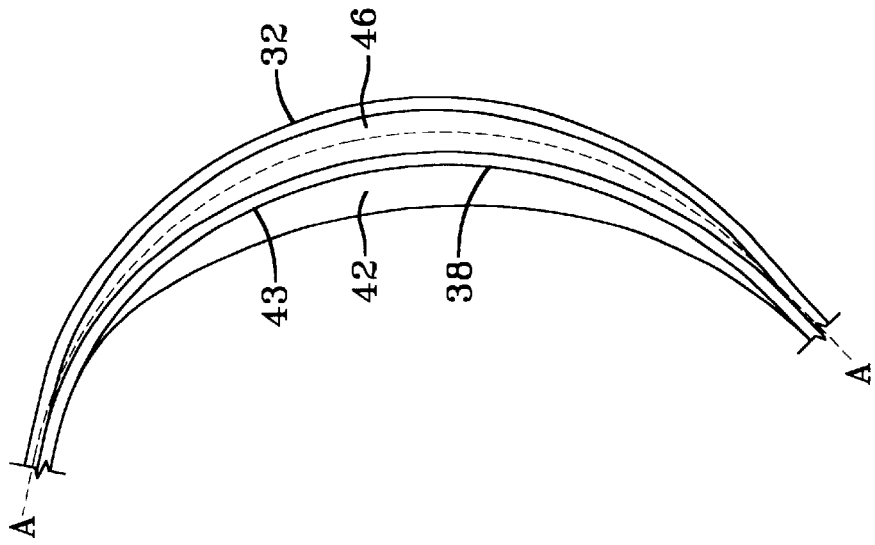
FIGS. 3A, 3B and 3C are cross-sectional schematic views of a prior art sidewall construction, and the sidewall construction of the inventive sidewall constructions of a first and second preferred embodiment. Each view shows in dashed lines the neutral bending axis.
Figure 3B:
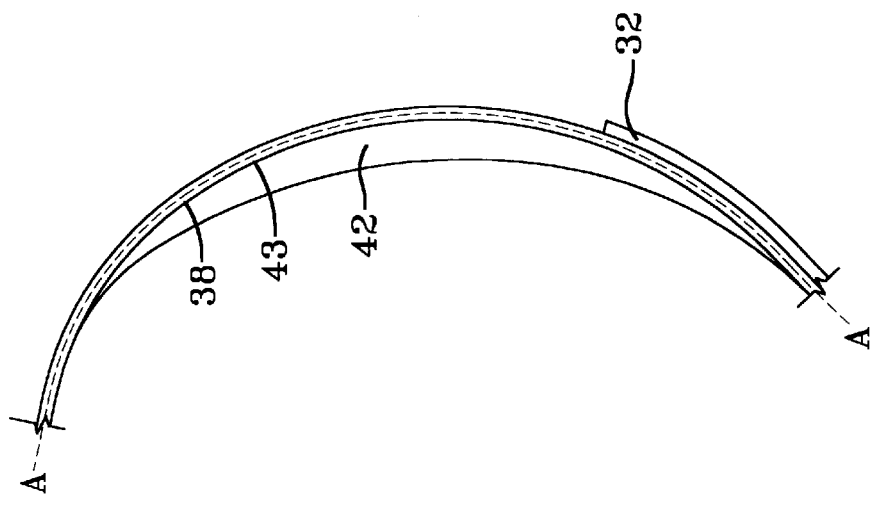
Figure 3A:
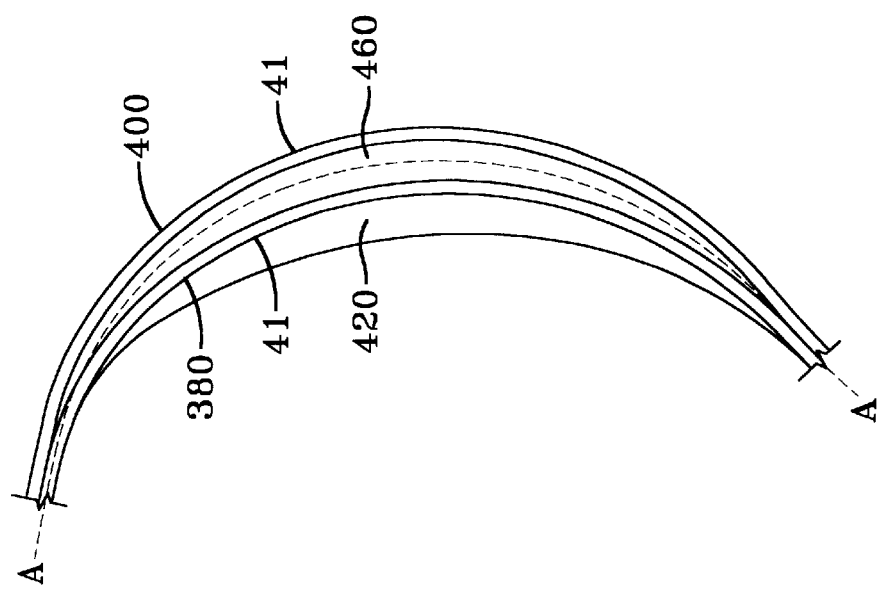

Referring to FIGS. 1 and 3A there is illustrated a portion of the cross section of a prior art tire 100 made in accordance with U.S. Pat. No. 5,368,082. The tire 100 is a passenger tire having a tread 120, a belt structure 360, a pair of sidewall portions 180,200, a pair of bead portions 220,220' and a carcass reinforcing structure 300. The carcass 300 includes a first ply 380 and second ply 400, a liner 350, a pair of beads 260,260' and a pair of bead fillers 480,480', a pair first insert fillers 420,420' and a pair of second insert fillers 460,460', the first insert filler 420,420' being located between the liner 350 and the first ply 380, the second insert fillers 460,460' being located between the first and second ply 380,400. This carcass structure 300 gave the tire 100 a limited runflat capability.

The term runflat as used in this patent means that the tire structure alone is sufficiently strong to support the vehicle load when the tire is operated in the uninflated condition, the sidewall and internal surfaces of the tire not collapsing or buckling onto themselves, without requiring any internal devices to prevent the tire from collapsing.

The conventional pneumatic tire when operated without inflation collapses upon itself when supporting a vehicle load.

As can be seen from FIG. 3A the structural reinforcement in the sidewall area of the tire 100 substantially increased the thickness of the overall sidewall particularly from the maximum section width radially outward to the shoulder. This prior art patent taught that the overall sidewall thickness where it merges with the shoulder should be at least 100% preferably 125% of the overall sidewall thickness as measured at the maximum section width. This was believed to be necessary to sufficiently support the load in an uninflated state. The inserts for a typical P275/40ZR17 tire weighed approximately 6.0 lb. The first insert 420,420' had a maximum gauge thickness of 0.30 inches (7.6 mm) the second insert 460,460' had a maximum gauge thickness of 0.17 inches (4.3 mm). Employing this original prior art concept in a P235/55R17 tire of a higher aspect ratio meant that the insert weight increased to about 6.8 pounds and the gauge thickness of the first insert was approximately 0.26 while the second insert had a maximum gauge was 0.24.

The reference numerals as depicted in the drawings are the same as those referred to in the specification. For purposes of this application the various embodiments illustrated in FIGS. 2A, 2B, 3B, 3C through 7 each use the same reference numerals for similar components. The structures employ basically the same components with variations in location or quantity thereby giving rise to the alternative constructions in which the inventive concept can be practiced.

The tire 10 according to the present invention employs a unique sidewall structure 20. Tires 10 as illustrated in FIGS. 2A, 2B, 3B and 3C through FIG. 7 are radial passenger or light truck tires; the tires 10 are provided with a ground-engaging tread portion 12 which terminates in the shoulder portions at the lateral edges 14,16 of the tread 12 respectively. A pair of sidewall portions 20 extends from tread lateral edges 14,16 respectively and terminates in a pair of bead regions 22 each having an annular inextensible bead core 26 respectively and extend radially outwardly to a terminal end directly under the belts 36. The tire 10 is further provided with a carcass reinforcing structure 30 which extends from bead region 22 through one sidewall portion 20, tread portion 12, the opposite sidewall portion 20 to bead region 22. The turnup ends 32 of at least one ply 38 carcass reinforcing structure 30 are wrapped about bead cores 26 respectively. The tire 10 may include a conventional innerliner 35 forming the inner peripheral surface of the tire 10 if the tire is to be of the tubeless type. Placed circumferentially about the radially outer surface of carcass reinforcing structure 30 beneath tread portion 12 is a tread reinforcing belt structure 36. In the particular embodiment illustrated, belt structure 36 comprises two cut belt plies 50,51 and the cords of belt plies 50,51 are oriented at an angle of about 23 degrees with respect to the mid-circumferential centerplane of the tire.

The cords of belt ply 50 are disposed in an opposite direction to the mid-circumferential centerplane and from that of the cords of belt ply 51. However, the belt structure 36 may comprise any number of belt plies of any desired configuration and the cords may be disposed at any desired angle. The belt structure 36 provides lateral stiffness across the belt width so as to minimize lifting of the tread from the road surface during operation of the tire in the uninflated state. In the embodiments illustrated, this is accomplished by making the cords of belt plies 50, 51 of steel and preferably of a steel cable construction.

The carcass reinforcing structure 30 comprises at least one reinforcing ply structures 38. In the particular embodiment illustrated in FIG. 2A, there is provided a reinforcing ply structure 38 with a radially outer ply turnup end 32, this ply structure 38 has preferably one layer of parallel cords 43. The cords 43 of reinforcing ply structure 38 are oriented at an angle of at least 75 degrees with respect to the mid-circumferential centerplane CP of the tire 10. In the particular embodiment illustrated, the cords 43 are oriented at an angle of about 90 degrees with respect to the mid-circumferential centerplane CP. The cords 43 are made of a material that is substantially inextensible and highly heat resistant, for example, and not by way of limitation, aramid or steel. Preferably, the cords are made of material or are coated with a material having a high adhesion property with rubber and high heat resistance.

Figure 2A:
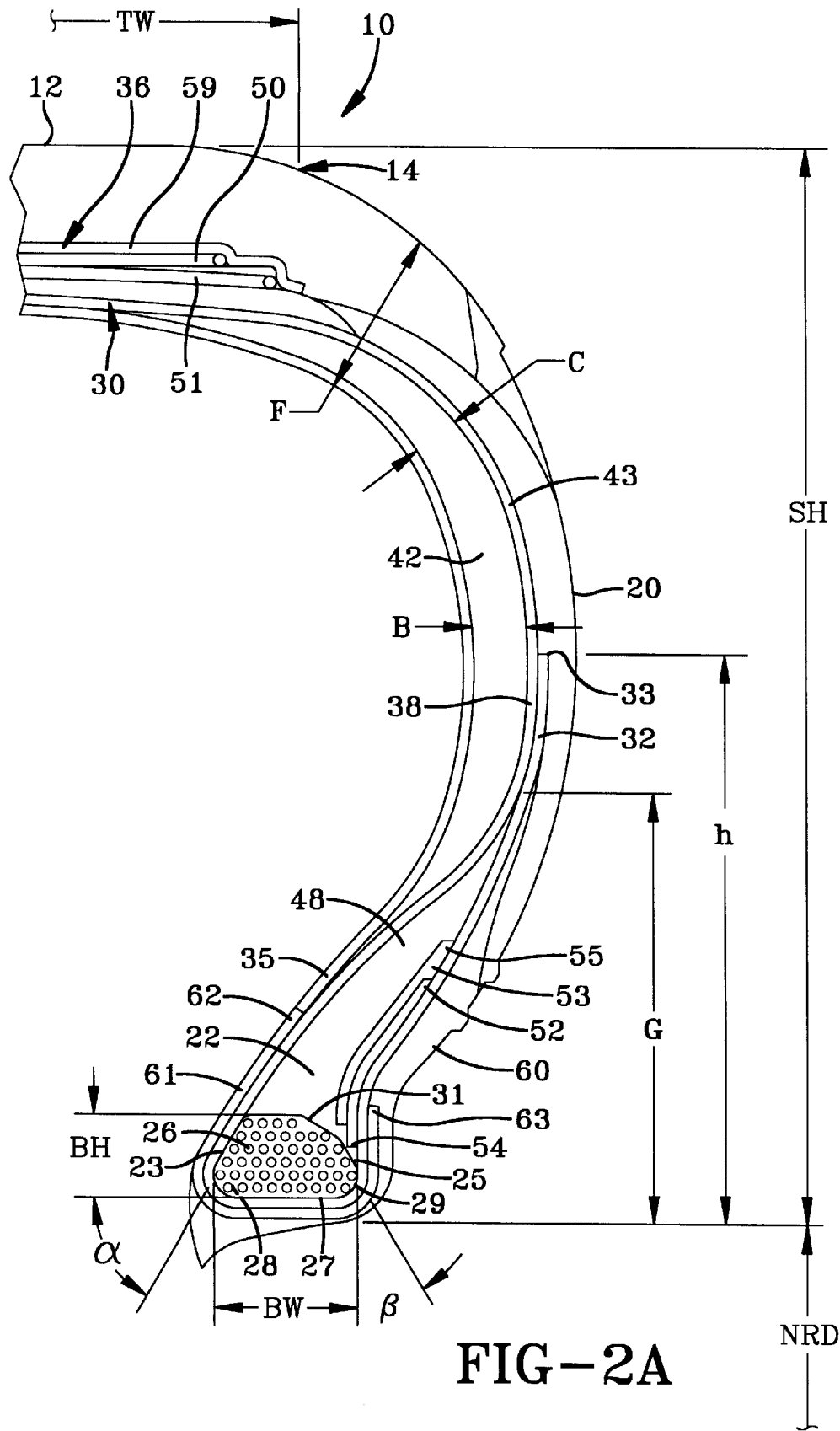
FIGS. 2A and 2B are an enlarged fragmentary cross-sectional view of a tread shoulder, a sidewall, and a bead region of the preferred first and second embodiment tires of the invention.

As shown in FIG. 2A the tire 10 has the ply turnup end 32 having a terminal end 33 at a radial height of about 40% of the section height (h) of the tire 10, preferably terminating at or above the location (h). The tire 10 of FIG. 2A has an elastomeric bead filler radially above the bead core 26. The filler is preferably made of a hard, stiff material which can be the same as the filler or insert 46 or may have slightly different properties.

The ply 38 follows a ply path adjacent the insert 46 and the filler 48. The combination of structures enable the sidewall 20 to be made of a substantially constant thickness. The insert 46 prevents the tire from buckling under compressive load even when the tire is operated deflated. The gauge thickness is a maximum at the location B. The insert can be made very thin in which case the runflat mileage will be reduced or the insert 46 can be thickened to increase the runflat performance.

When the cords 43 are steel cords the tire can be made such that the inserts 46 are very thin. In such a case the tire 10 can be designed to be runflat over a limited distance while the steel cords 43 and the tire is damaged such that the tire 10 is no longer repairable. This concept lets the tire be manufactured at a very low cost sufficient to justify simply scrapping the tire once it has successfully enabled the driver to reach his local service station, tire store, or whatever destination he chooses. In the prior art runflat tire's survival of the flat tire was considered essential due to the high cost of manufacture. As the technology, materials and need for personal security have increased the cost of the replacement tire is becoming lower while the need for security is becoming more valued. The use of steel cords in the ply 38 enables the tire to stay intact for longer periods at much higher operating temperatures.

The tire 10 of the present invention is ideally suited for high performance tires having a low profile and aspect ratios below 65% and is very suitable for the class of vehicle commonly referred to as sport utility vehicles, vans, or light pickup trucks. These steel ply tires have excellent durability and although a heavily loaded truck may not have much runflat potential, that same truck unloaded or lightly loaded may have excellent runflat range. These extended mobility tires are generally used in conjunction with a pressure sensing warning device which alerts the driver when he is operating with a tire below a critical pressure. This enables the driver to exercise some judgement as to how far he should go under the load condition of his vehicle.

In the particular embodiment illustrated the cords 43 are made from 1×5×0.18 steel cord. The cords 43 have a modulus E of X, X being at least 150 GPa. One way of achieving such strength is by merging the proper process and alloys as disclosed in U.S. Pat. Nos. 4,960,473 and 5,066,455, which are hereby incorporated by reference in its entirety herein, with a steel rod microalloyed with one or more of the following elements: Ni, Fe, Cr, Nb, Si, Mo, Mn, Cu, Co, V and B. The preferred chemistry is listed below in weight percentages:

| | |
|---|---|
| C | 0.78 to 1.0 |
| Mn | 0.30 to 0.05 |
| Si | 0.10 to 0.3 |
| Cr | 0 to 0.4 |
| V | 0 to 0.1 |
| Cu | 0 to 0.5 |
| Ni | 0 to 0.5 |
| Co | 0 to 0.1 |
| the balance being iron and residuals | |

The resulting rod is then drawn to the appropriate tensile strength.

The cords 43 for use in the carcass 30 may comprise from one (monofilament) to multiple filaments. The number of total filaments in the cord 43 may range from 1 to 30. Preferably, the number of filaments in per cord 43 ranges from 6 to 7. The individual diameter (D) of each filament 9 generally ranges from 0.10 to 0.30 mm for each filament having at least a tensile strength of 2000 to 5000 MPa, preferably above 3000 MPa. Preferably, the diameter of each filament ranges from 0.15 to 0.22 mm.

Another critical property of the steel cord 43 is that the total elongation for each filament in the cord must be at least 2 percent over a gauge length of 25 centimeters. Total elongation is measured according to ASTM A370-92. Preferably, the total elongation of the cord ranges from about 2 percent to 4 percent. A particularly preferred total elongation ranges from about 2.2 to about 3.0 percent.

The torsion values for the steel for the filament used in the cord should be at least 20 turns with a gauge length of 200 times the diameter of the wire. Generally, the torsion value ranges from about 20 to about 100 turns. Preferably, the torsion values range from about 30 to about 80 turns with a range of from about 35 to 65 being particularly preferred. The torsion values are determined according to ASTM Test Method E 558-83 with test lengths of 200 times the diameter of the wire.

There are a number of specific metallic cord 43 constructions for use in the carcass ply 38 or 40. Representative examples of specific cord constructions include 1×, 2×, 3×, 4×, 5×, 6×, 7×, 8×, 11×, 12×, 1+2, 1+4, 1+5, 1+6, 1+7, 1+8, 2+1, 3+1, 5+1, 6+1, 11+1, 12+1, 2+7, 2+7+1, 3+9, 1+5+1 and 1+6+1 or 3+9+1, the outer wrap filament may have a tensile strength of 2500 MPa or greater based on a filament diameter of 0.15 mm. The most preferred cord constructions including filament diameters are 3×0.18, 1+5×0.18, 1+6×0.18, 2+7×0.18, 2+7×0.18×1×0.15, 3+9×0.18+1×0.15, 3+9×0.18, 3×0.20+9×0.18 and 3×0.20+9×0.18+1×0.15. The above cord designations are understandable to those skilled in the art. For example, designation such as 2×, 3×, 4×, and 5× mean a bunch of filaments; ie, two filaments, three filaments, four filaments and the like. Designation such as 1+2 and 1+4 indicate, for example, a single filament wrapped by two or four filaments.

The carcass ply 38 has a layer of the above-described steel cords arranged so as to have from about 5 to about 100 ends per inch (≈2 to 39 ends per cm) when measured at the equatorial plane of the tire. Preferably, the layer of cords are arranged so as to have about 7 to about 60 ends per inch (≈2.7 to 24 ends per cm) at the equatorial plane. The above calculations for ends per inch are based upon the range of diameters for the cord, strength of the cord and the practical strength requirement for the carcass ply 38. For example, the high number of ends per inch would include the use of a lower diameter cord for a given strength versus a lower number of ends per inch for a higher diameter wire for the same strength. In the alternative, if one elects to use a cord of a given diameter, one may have to use more or less ends per inch depending on the strength of the cord.

The metallic cords 43 of the carcass ply 38 are oriented such that the tire 10 according to the present invention is what is commonly referred to as a radial.

The steel cord of the carcass ply intersect the equatorial plane (EP) of the tire at an angle in the range of from 75° to 105°. Preferably, the steel cords intersect at an angle of from 82° to 98°. The preferred range is from 89° to 91°.

The ply 38 has a plurality of fine diameter cords 43 with the cord diameter C less than 0.75 mm. The cord 43 can be any of the before mentioned cords including but not limited to 1+5×0.18 mm or 3×0.18 mm or a monofilament wire having a diameter of about 0.25 mm, preferably 0.175 mm. It is considered desirable that these cords 43 have filaments having a minimum tensile strength of at least 2000 MPa and over 2.0 percent elongation, preferably above 3000 MPa and over 2.5 percent elongation. Due to the tremendous strength and very small diameter of filaments and cords have exceptional flexibility making the cord material less subject to fatigue failure of conventional larger diameter low tensile strength steel filaments and cords.

Figure 2B:
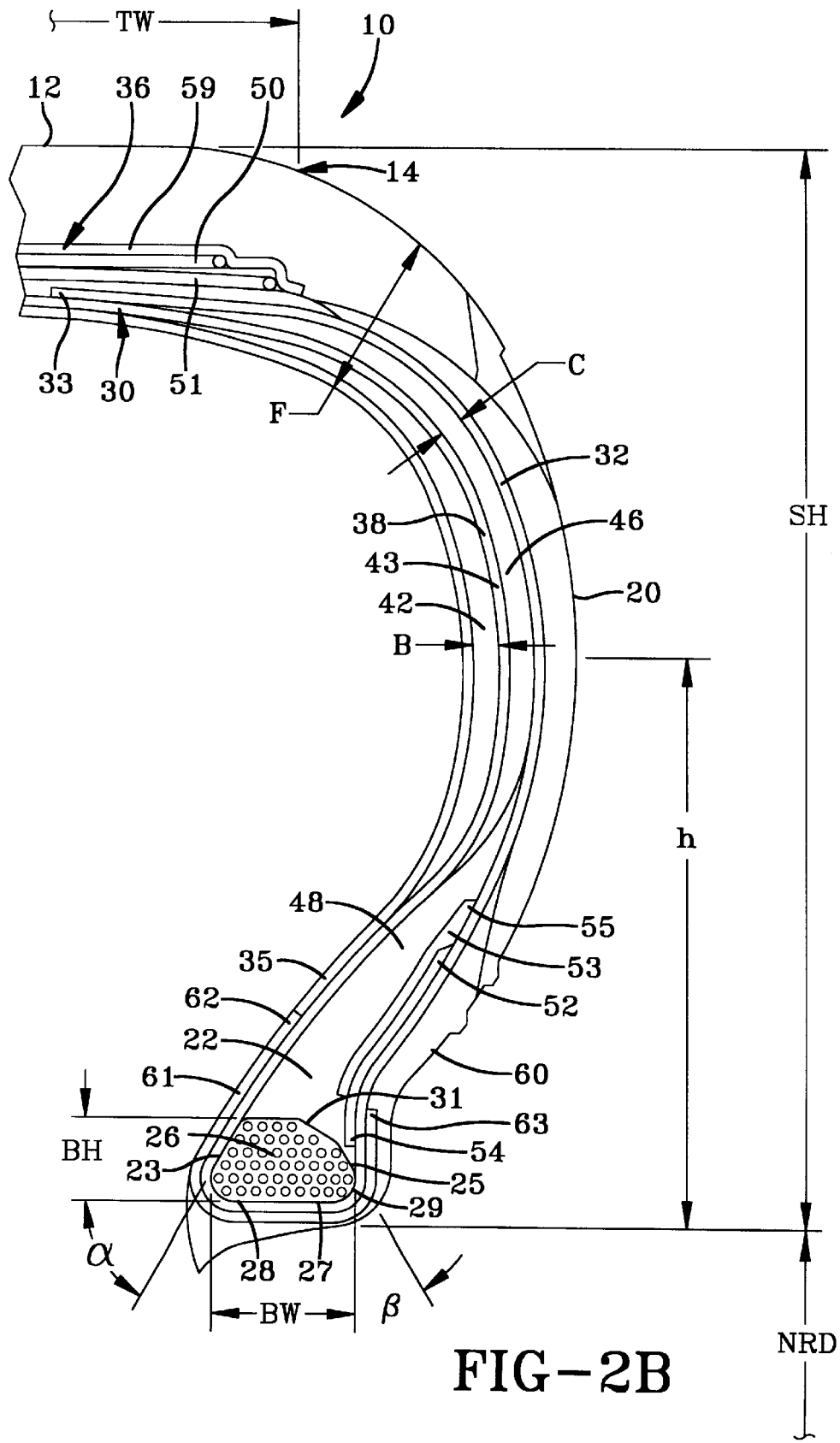

As further illustrated in FIGS. 2A or 2B, the bead regions 22 of the tire 10 each have an annular substantially inextensible first and second bead cores 26 respectively. The bead cores 26 each have a flat base surface 27 defined by an imaginary surface tangent to the radially innermost surfaces of the bead wires. The flat base surface 27 has a pair of edges 28,29 and a width "BW" between the edges. The bead core 26 has an axially inner first surface 23 extending radially from edge 28 and an axially outer second surface 25 extending radially from edge 29. The first surface 23 and the flat base surface 27 form an acute included angle α. The second surface 25 and the flat base surface 27 form an acute included angle β. The angle α is greater than or equal to the angle β. In the preferred embodiment, α approximately equals β.

The bead core 26 may further include a radially outer surface 31 extending between the first and second surfaces 23,25 respectively. The radial outer surface 31 has a maximum height "BH." The height BH is less than the width of the base BW. The cross-section defined by surfaces 23,25, 27, and 31 preferably are in the form of an isosceles triangle. The upper portion of the triangular shape cross-section is generally not required because the strength of the core 26,26' as illustrated is sufficient to restrain the beads of an uninflated tire on the rim.

The bead core is preferably constructed of a single or monofilament steel wire continuously wrapped. The wire may be flat wire of mono or multifilaments. In the preferred embodiment 0.050 inch diameter wire is wrapped in layers radially inner to radially outer of 8,7,6,4,2 wires, respectively.

The flat base surfaces of the first and second bead cores 26 are preferably inclined relative to the axis of rotation, and the bottom of the molded portion of the bead is similarly inclined, the preferred inclination being approximately about 10° relative to the axis of rotation more preferably about 10.5°. The inclination of the bead region assists sealing the tire and is about twice the inclination of the bead seat flange of a conventional rim and is believed to facilitate assembly and to assist retaining the beads seated to the rim.

As shown in FIGS. 2B and 3C located within the bead region 22 and the radially inner portions of the sidewall portions 20 are high modulus elastomeric insert 46 disposed between carcass ply reinforcing structure 38 and the turnup ends 32, respectively. The elastomeric inserts 46 extend from the radially outer portion of bead cores 26 respectively, up into the sidewall portion gradually decreasing in cross-sectional width. The elastomeric inserts 46 terminate at a radially outer end near the belt structure of the tire. In the particular embodiment illustrated, the elastomeric fillers 46 each extend laterally under the belts 36 from their respective belt ends a distance of approximately 25 percent (25%) of the belt width.

For the purposes of this invention, the maximum section height SH of the tire shall be considered the radial distance measured from the nominal rim diameter NRD of the tire to the radially outermost part of the tread portion of the tire. Also, for the purposes of this invention, the nominal rim diameter shall be the diameter of the tire as designated by its size.

In a preferred embodiment of the invention the bead regions 22 further includes at least one cord reinforced member 52,53 located between the insert 46 and the ply turnup end 32. The cord reinforced member or members 52,53 have a first end 54 and a second end 55. The first end 54 is axially and radially inward of the second end 55. The cord reinforced member or members 52,53 increase in radial distance from the axis of rotation of the tire 10 as a function of distance from its first end 54. In the illustrated FIGS. 2A or 2B, the cord reinforced member comprises two components 52,53 having a width of about 4 cm. The axially outer component 52 has a radially inner end 54 that is radially above with the outer edge 29 of the first and second bead cores 26. The axially inner component 53 has a radially inner end that is radially outward of the outer edge 29 of the bead core 26 by about 1 cm. The axially inner and axially outer components 52,53, preferably have rayon, nylon, aramid or steel cord reinforcement. The second end 55 of the cord reinforced member is located radially outward of the bead core 26 and radially inward of the termination of the turnup end 32 of the first ply 38 by a distance at least 50% of the section height h.

The cords of members 52,53 are preferably inclined forming an included angle relative to the radial direction in a range from 25° to 75°, preferably 30°. If two members are employed, the cord angles are preferably equal but oppositely disposed. The cord reinforcement member 52,53 improves the handling characteristics of a car having an uninflated tire of the present invention. The members 52,53 greatly reduce the tendency for the car to oversteer, a significant problem encountered in conventional tires that are driven while uninflated or underinflated.

A fabric reinforced member 61 may be added to the bead regions 22 of the tire 10. The fabric reinforced member has first and second ends 62,63. The member is wrapped about the ply 38 and the bead core 26. Both the first and the second ends 62,63 extend radially above and outward of the bead core 26.

The sidewall portions 20 are provided with first fillers 42. The first fillers 42 is employed between the innerliner 35 and the first reinforcement ply 38. The first fillers 42 extend from each bead region 22 radially to near or beneath the reinforcing belt structures 36. As illustrated in the preferred second embodiment of the invention as shown in FIGS. 2B and 3C, the sidewall portions 20 each include a first filler 42 and a second filler 46. The first fillers 42 are positioned as described above. The second fillers 46 are located between the first ply 38 and the turnup ends 32 of ply 38 respectively. The second filler 46 extends from each bead region 22 radially outward in proximity to the reinforcing belt structure 36.

As shown in FIG. 2B, the first fillers 42 preferably have a maximum thickness B at a location approximately radially aligned with the maximum section width of the tire 10, the thickness B being about three percent (3%) of the maximum section height SH. For example, in a P235/55R17 touring tire the thickness B of the insert 42 equals 0.10 inch (2.5 mm)

For purposes of this invention, the maximum section width (SW) of the tire is measured parallel to the rotational axis of the tire from the axially outer surfaces of the tire, exclusive of indicia, adornment and the like. Also, for the purposes of this invention the tread width is the axial distance across the tire perpendicular to the equatorial plane (EP) of the tire as measured from the footprint of the tire inflated to maximum standard inflation pressure, at rated load and mounted on a wheel for which it was designed. In the particular embodiments illustrated in FIGS. 2B, the first fillers 42 each have a maximum thickness B of approximately 3 percent (3%) of the maximum section height SH at a location (h) approximately radially aligned the maximum section width of the tire.

The second fillers 46 preferably have a maximum thickness C of at least one and one-half percent (1.5%) of the maximum section height of the tire 10 at the location radially above the maximum section width of the tire. In the preferred embodiment the elastomeric second fillers 46 each have a thickness C of approximately one and one-half percent (1.5%) of the maximum section height SH of the tire at a radial location of about 75% of the section height SH. For example, in a P275/40ZR17 size high performance tire the thickness C of the tire equals 0.08 inches (2 mm). At the location h, approximately radially aligned with the location of the maximum section width of the tire, the thickness of the second filler is 0.05 inches (1.3 mm).

The overall cross-sectional thickness of the combination of elastomeric fillers 42,46 preceding from the bead cores 26 to the radial location of the maximum section width (SW) is preferably of constant thickness. The overall sidewall and carcass thickness is about 0.45 inches (11.5 mm) at the maximum section width location E and increases to an overall thickness F, in the region where it merges into the shoulder near the lateral tread edges 14,16, F being about two hundred percent (200%) of the overall sidewall thickness as measured at the maximum section width SW of the tire. Preferably, the overall thickness F of the sidewall in the shoulder region of the tire is at least one hundred twenty five percent (125%) of the overall sidewall thickness at the maximum section width (SW), more preferable at least 150%. This ratio means that the sidewall is substantially thinner than the predecessor type runflat tires.

As in the conventional high performance type tires, the tires illustrated in the Figures of the various embodiments may enhance the high speed performance of the tire by the application of a fabric overlay layer 59 disposed about the tread reinforcing belt structure 36. For example, two ply layers having nylon or aramid cords may be disposed above each reinforcing belt structures 36, the lateral ends extending past the lateral ends of the belt structures 36. Alternatively, a single layer of spirally wound aramid reinforced fabric can be employed as an overlay. The aramid material has a substantially higher modulus of elasticity than nylon and accordingly results in a stronger tire reinforcement than two layers of nylon. Applicants have found that a greater than 10% increase in high speed capability can be achieved in a tire with the single layer of aramid overlay. Generally the use of aramid material in passenger tire applications is avoided due in part to the fact that the material exhibits poor noise properties that resonate sounds through the relatively thin sidewalls of the passenger tire. Applicants' tire of the present invention employs reinforced sidewalls which noticeably dampen tire generated noises. The noise dampening sidewalls permit the use of an aramid overlay without experiencing unacceptable noise levels.

Figure 6:
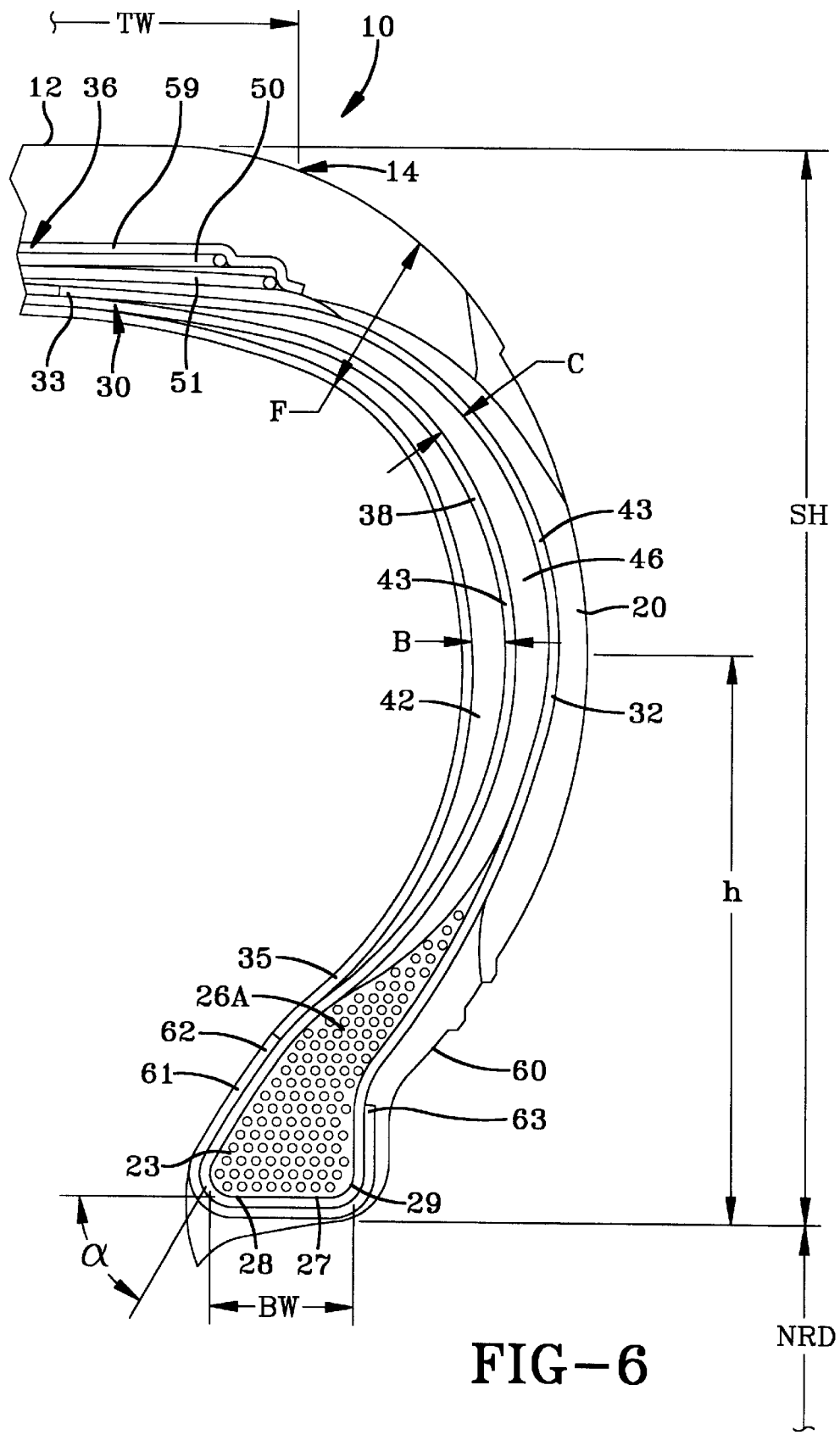
FIG. 6 is an alternative embodiment showing an extended bead used in the sidewall cross-section.

The second fillers 46, as shown, are made of elastomeric material. These filler inserts can be used in multiples of inserts interposed between adjacent plies when more than two plies are used in the carcass structure as shown in FIG. 6.

Figure 4:
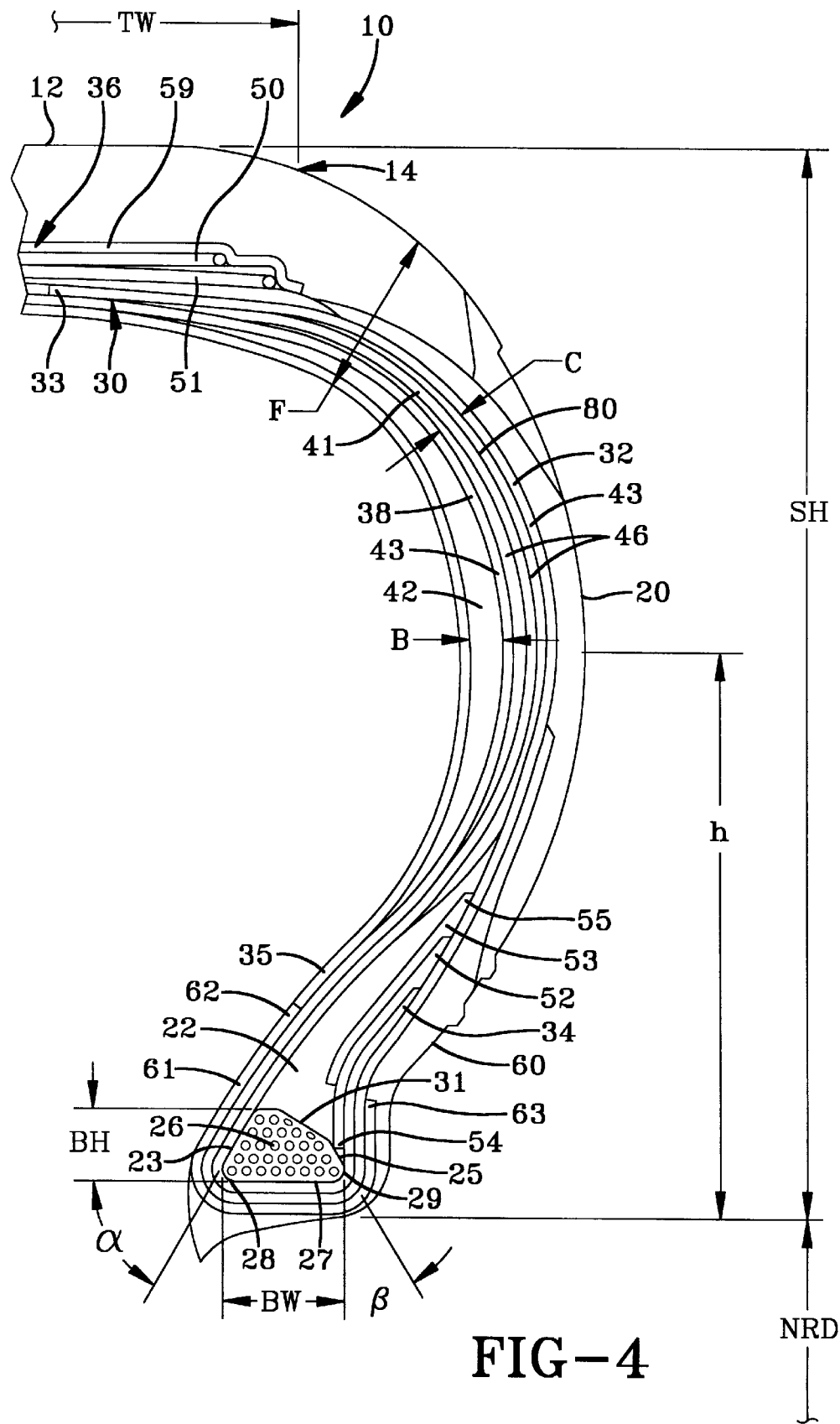
FIG. 4 is an alternative embodiment wherein the multiple inserts 46 are cord reinforced.

Alternatively, the inserts may be cord reinforced themselves, in the embodiment of FIG. 4 the uses of adjacent fillers 46 in combination with the cord reinforced insert 80 is considered beneficial. The multiple adjacent cord 41 reinforced fillers can be positioned such that the radially outer ends are either terminated under the belt structure while the radially inner ends terminate above, adjacent to the bead cores 26 or are wrapped around the bead cores 26, similar to a ply.

Figure 5:
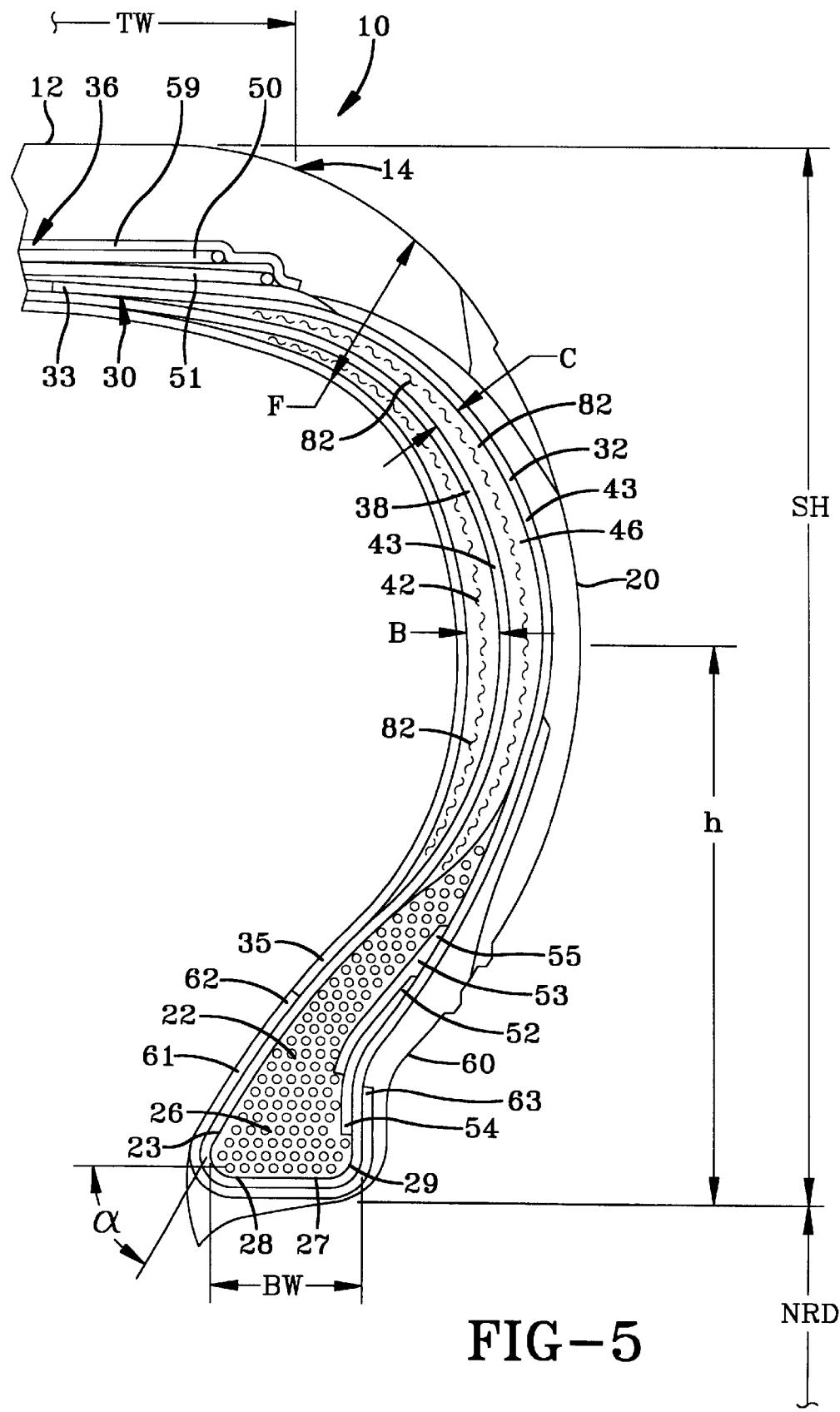
FIG. 5 is an alternative embodiment wherein the inserts 46 are short fiber loaded.

The inserts 42,46 may alternatively be loaded with short fibers as shown in FIG. 5, which are preferably oriented at an angle of at least 45° to enhance the radial and lateral stiffness of the insert, preferably the fibers are radially oriented. Preferably the cords 41 or short fibers 82 are made of textile or synthetic materials such as rayon, polyester or aramid. These cords 41 or short fibers 82 can be radially directed or positioned at bias angles preferably at least 45° but should not be circumferentially extending.

The first filler insert 42 is preferably made of elastomeric material. The first filler actually prevents the tire's sidewall from collapsing when operating under no inflation pressure the insert can be of a wide range of shore A hardnesses from a relative soft shore A of about 50 to very hard 85, the material shape and cross-sectional profile is modified accordingly to insure the ride performance and sidewall spring rate is acceptable. The stiffer the material the thinner the cross-section generally.

The second filler 46 can be of the same or different material physical properties relative to the first insert filler 42. This means that the combination of a hard second filler 42 with a soft first filler is contemplated as well as the combination of a hard first filler 42 with a softer second filler 46. The elastomeric materials of the second filler 46 similarly are in the 50 to 85 shore A range preferably 50 to less than 80 shore A.

The second fillers 46 when unreinforced act as a spacer between the adjacent ply 38 and its turnup. The cords of ply turnup are placed in tension when the tire is operated uninflated. When reinforced the fillers 46 also contributed to the sidewall supporting structure.

As shown, the sidewalls when deflected under no inflation pressure or even when inflated, place the radially outer portion of the cords 43 into tension while the radially inner portion cords 43 when experiencing a downward load try to locally compress when the tire is deflated or deflected The tire 10 as described above enables the tire designer to tune a particular tire's design features to achieve a soft luxurious feel to a stiffer more performance feel. Furthermore, the unique combination described above permits tires to be built having higher aspect ratios than heretofore was practical. The combination of unique features means that the designer can choose between extended runflat performance or tire weight reductions as well.

The use of a single steel cord 43 reinforced ply 38 to achieve the runflat performance can have a very high spring rate.

Furthermore, the use of inserts reinforced with cords 41 or short fibers 82 can further provide additional compression stiffness to enhance the runflat performance as shown in FIGS. 4 and 5.

The prior art sidewall 200 as shown in FIG. 3A has a bending axis (A) shown in dotted lines for the prior art rayon ply structure. The bending axis (A) is substantially centered about the insert filler 460.

The sidewall 20 of the tire 10 according to the invention as shown in FIG. 3C has the bending axis (A) similarly centered between the ply 38 and its turnup 32. In FIG. 3B the bending axis lies along the ply 38 path.

Ideally, the spring rate of the tire 10 in the inflated condition should not change appreciably from that of a conventional non-runflat pneumatic tire used in a similar application. When the runflat tire is operated in the uninflated state the spring rate must be sufficient to prevent the tire from buckling or collapsing onto itself.

Runflat performance of the tire may be further enhanced by providing the ply coat of each layer of the reinforcing ply structures 38 with an elastomeric material having substantially the same physical properties as that of the elastomeric fillers 42,46. As is well known to those skilled in the tire art, the ply coat of a fabric layer is the layer of unvulcanized elastomeric material which is applied to fabric prior to its being cut to its desired shape and applied to the tire on the tire building drum. In many applications it is preferable that the elastomeric material used as a ply coat for the ply layers is similar to the elastomeric material used in the reinforcing fillers 42,46.

In practice, the rubber compositions for the first fillers 42, second fillers 46 and the ply coats for one or more ply structures 38 utilized in this invention for the aforesaid pneumatic tire construction are preferably characterized by physical properties which enhance their utilization in the invention which are, collectively, believed to be a departure from properties of rubber compositions normally used in pneumatic tire sidewalls, particularly the combination of first and second fillers 42 and 46 with ply 38 having a combination of either dissimilar or similar high stiffness yet essentially low hysteresis properties as hereinafter described.

Preferably, while the discussion herein refers to the ply coat(s) being for one or more of ply structures 38,80 in the practice of this invention, the plycoats referenced herein refers to plycoats for ply 38 and cord reinforced inserts 80.

In particular, for the purposes of this invention, both of the aforesaid fillers 42 and 46 were evaluated by having a high degree of stiffness yet by also having a relatively low hysteresis for such a degree of stiffness.

The stiffness of the rubber composition for fillers 42 and 46 is desirable for stiffness and dimensional stability of the tire sidewall.

The stiffness of the rubber composition for the ply coat for ply 38 is desirable for overall dimensional stability of the tire carcass, including its sidewalls, since it extends through both sidewalls and across the crown portion of the tire.

As a result, it is considered that the stiffness properties of the aforesaid rubber compositions of the first and second fillers 42 and 46 and of the ply structures 38 cooperate to reinforce each other and to enhance the aforesaid dimensional stability of the tire sidewalls to a greater degree than if either of the aforesaid fillers or plycoats were alone provided with a high stiffness rubber composition.

However, it is to be appreciated that rubbers with a high degree of stiffness in pneumatic tires normally be expected to generate excessive internal heat during service conditions (operating as tires on a vehicle running under load and/or without internal inflation pressure), particularly when the rubber's stiffness is achieved by a rather conventional method of simply increasing its carbon black content. Such internal heat generation within the rubber composition typically results in a temperature increase of the stiff rubber and associated tire structures which can potentially be detrimental to the useful life of the tire.

The hysteresis of the rubber composition is a measure of its tendency to generate internal heat under service conditions. Relatively speaking, a rubber with a lower hysteresis property generates less internal heat under service conditions than an otherwise comparable rubber composition with a substantially higher hysteresis. Thus, in one aspect, a relatively low hysteresis is desired for the rubber composition for the fillers 42 and 46 and the plycoat(s) for the ply 38.

Hysteresis is a term for heat energy expended in a material (eg:; cured rubber composition by applied work and low hysteresis of a rubber composition is indicated by a relatively high rebound, a relatively low internal friction and relatively low loss modulus property values.

Accordingly, it is important that the rubber compositions for one or more of the fillers 42 and 46 and plycoats for the ply 38 have the properties of both relatively high stiffness and low hysteresis.

The following selected desirable properties of the rubber compositions for the fillers 42 and 46 as well as for the plycoats for the ply 38 are summarized in the following Table 1.

TABLE 1

| Properties | Filler | Ply Coat |
|---|---|---|
| Hardness (Shore A)[2] | 50–85 | 50–85 |
| Modulus (100%) MPa[3] | 5–7 | 4–6 |
| Static Compression[1] | 0.1–0.15 | 0.15–0.2 |
| Heat Build-up (° C.)[1] | <30 | <30 |
| Cold Rebound (about 23° C.)[4] | 50–70 | 50–85 |
| E' at 100° C. (MPa) | 10–15 | 10–15 |
| E" at 100° C. (MPa) | 0.5–1.5 | 1–1.5 |

[1]Goodrich Flexometer Test-ASTM Test No. D623
[2]Shore Hardness Test-ASTM Test No. D2240
[3]Tension Modulus Test-ASTM Test No. D412
[4]Zwick Rebound Test-DIN 53512

The indicated hardness property is considered to be an expanded range of moderate rubber hardness permitted by the use of the unique ply structure.

The indicated modulus property at 100% modulus is utilized instead of a 300% modulus because the cured rubber has a relatively low ultimate elongation at its breaking point. Such a cured rubber is considered stiff.

The indicated static compression property, measured on a flexometer, is another indication of the relatively high stiffness of the cured rubber.

The indicated E' property is a coefficient of the storage or elastic moduli component of the viscoelastic property which is an indication of the material (eg: cured rubber composition) stiffness.

The indicated E" property is a coefficient of the loss or viscous moduli component of the viscoelastic property which is an indication of the hysteretic nature of the material (eg: cured rubber composition).

The utilization of both the E' and E" properties to characterize stiffness and hysteresis of rubber compositions is well known to those having skill in such characterizations of rubber.

The indicated heat buildup value is measured by a Goodrich flexometer (ASTM D623) test and is indicative of the internal heat generation of the material (eg: cured rubber composition)

The indicated cold rebound test property at about 23° C. (room temperature) is measured by Zwick Rebound Test (DIN 53512) test and is indicative of the material's (eg: cured rubber composition) resilience.

Thus, the properties illustrated in Table 1 indicate a cured rubber composition with a relatively high stiffness, moderate hardness and a relatively low hysteresis for a rubber with such a high stiffness.

The low hysteresis is demonstrated by the relatively low heat buildup, low E" and high rebound properties and is considered necessary for a rubber composition desired to have a relatively low internal heat buildup in service.

In the compounding of the various tire components, various rubbers may be used which are, preferably, relatively high unsaturation diene-based rubbers. Representative examples of such rubbers are, although they may not be so limited, are: styrene-butadiene rubber, natural rubber, cis 1,4 and 3,4-polyisoprene rubbers, cis 1,4 and vinyl 1,2-polybutadiene rubbers, acrylonitrile-butadiene rubber, styrene-isoprene-butadiene rubber and styrene-isoprene rubber.

Various of the preferred rubbers for the rubber compositions for the fillers 42 and 46 and for the plycoat(s) for the ply 38 are natural cis 1,4-polyisoprene rubber, isoprene/butadiene rubber, and cis 1,4-polybutadiene rubber.

Preferred combinations, or blends, of rubbers are natural cis 1,4-polyisoprene rubber and cis 1,4-polybutadiene rubber for the fillers and natural cis 1,4-polybutadiene rubber and isoprene/butadiene copolymer rubber for the plycoat(s).

In a preferred practice, based on 100 parts by weight rubber, (A) the fillers are comprised of about 60 to 100, preferably about 60 to 90, parts natural rubber and, correspondingly, up to about 40, preferably about 40 to about 10, parts of at least one of cis 1,4 polybutadiene rubber and isoprene/butadiene rubber preferably cis 1,4-polybutadiene rubber, where said isoprene/butadiene rubber, if used, is present in a maximum of 20 parts, and (B) the said plycoat(s) are comprised of up to 100, preferably about 80 to about 100 and more preferably about 80 to about 95, parts natural rubber and, correspondingly, up to about 100, preferably up to about 20 and more preferably about 20 to about 5, parts of at least one of isoprene/butadiene copolymer rubber and cis 1,4 polybutadiene rubber, preferably an isoprene/butadiene rubber; wherein the ratio of isoprene to butadiene in said isoprene/butadiene copolymer rubber is in a range of about 40/60 to about 60/40.

It is further contemplated, and is considered to be within the intent and scope of this invention that a small amount, such as about 5 to about 15 parts, of one or more organic solution polymerization prepared rubbers may be included with the aforesaid natural rubber, and cis 1,4 polybutadiene rubber and/or isoprene/butadiene rubber composition(s) for the said fillers and/or plycoat(s), of which the option and selection of such additional rubber(s) can be made by one having skill in the rubber compounding art without undue experimentation.

Thus, in such circumstance, the description of the filler and plycoat rubbers is set forth in a "comprising" manner with the intent that small amounts of such solution polymerization prepared elastomers can be added so long as the aforesaid physical property parameters of the cured rubber compositions are met. It is considered that such rubber compounding is within the skill of those with experience in the rubber compounding art without undue experimentation.

While not necessarily limited thereto, such other contemplated solution prepared rubbers are styrene/butadiene, and polymers of one or more of isoprene and butadiene such as 3,4-polyisoprene, styrene/isoprene/butadiene terpolymers and medium vinyl polybutadiene.

It should readily be understood by one having skill in the art that rubber compositions for components of the pneumatic tire, including the first and second fillers 42 and 46 as well as ply coat(s) for the ply 38 or insert 80, can be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as rubber processing oils, resins including tackifying resins, silicas, and plasticizers, fillers, pigments, stearic acid or other materials such as tall oil resins, zinc oxide, waxes, antioxidants and antiozonants, peptizing agents and reinforcing materials such as, for example, carbon black. As known to those skilled in the art, depending on the intended use of the sulfur vulcanizable and sulfur vulcanized materials (rubbers), the certain additives mentioned above are selected and commonly used in conventional amounts.

Typical additions of carbon black comprise about 30 to about 100 parts by weight, of diene rubber (phr), although about 40 to about a maximum of about 70 phr of carbon black is desirable for the high stiffness rubbers desired for the indicated fillers and plycoat(s) used in this invention. Typical amounts of resins, if used, including tackifier resins and stiffness resins, if used, including unreactive phenol formaldehyde tackifying resins and, also stiffener resins of reactive phenol formaldehyde resins and resorcinol or resorcinol and hexamethylene tetramine may collectively comprise about 1 to 10 phr, with a minimum tackifier resin, if used, being 1 phr and a minimum stiffener resin, if used, being 3 phr. Such resins may sometimes be referred to as phenol formaldehyde type resins. Typical amounts of processing aids comprise about 4 to about 10.0 phr. Typical amounts of silica, if used, comprise about 5 to about 50, although 5 to about 15 phr is desirable and amounts of silica coupling agent, if used, comprise about 0.05 to about 0.25 parts per part of silica, by weight. Representative silicas may be, for example, hydrated amorphous silicas. A representative coupling agent may be, for example, a bifunctional sulfur containing organo silane such as, for example, bis-(3-triethoxy-silylpropyl) tetrasulfide, bis-(3-trimethoxy-silylpropyl) tetrasulfide and bis-(3-trimethoxy-silylproply) tetrasulfide grafted silica from DeGussa, AG. Typical amounts of antioxidants comprise 1 to about 5 phr. Representative antioxidants may be, for example, diphenyl-p-phenylenediamine and others, such as those disclosed in the *Vanderbilt Rubber Handbook* (1978), pages 344–346. Suitable antiozonant(s) and waxes, particularly microcrystalline waxes, may be of the type shown in the *Vanderbilt Rubber Handbook* (1978), pages 346–347. Typical amounts of antiozonants comprise 1 to about 5 phr. Typical amounts of stearic acid and/or tall oil fatty acid may comprise about 1 to about 3 phr. Typical amounts of zinc oxide comprise about 2 up to about 8 or 10 phr. Typical amounts of waxes comprise 1 to about 5 phr. Typical amounts of peptizers comprise 0.1 to about 1 phr. The presence and relative amounts of the above additives are not an aspect of the present invention which is primarily directed to the utilization of specified blends of resins in tire treads as sulfur vulcanizable compositions.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 8 phr with a range of from 3 to about 5 being preferred for the stiff rubbers desired for use in this invention.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 3 phr. In another embodiment, combinations of two or more accelerators in which a primary accelerator is generally used in the larger amount (0.5 to about 2 phr), and a secondary accelerator which is generally used in smaller amounts (0.05–0.50 phr) in order to activate and to improve the properties of the vulcanizate. Combinations of such accelerators have historically been known to produce a synergistic effect of the final properties of sulfur cured rubbers and are often somewhat better than those produced by use of either accelerator alone. In addition, delayed action accelerators may be used which are less affected by normal processing temperatures but produce satisfactory cures at ordinary vulcanization temperatures. Representative examples of accelerators include amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound, although a second sulfenamide accelerator may be used. In the practice of this invention, one and sometimes two, or more accelerators are preferred for the high stiffness rubbers.

The tire can be built, shaped, molded and cured by various methods which will be readily apparent to those having skill in the art.

As disclosed, the test tires 10 and the prior art tires 100 were constructed using the physical properties of the ply coat and the inserts as disclosed in the prior art patent The tire 10 of the present invention contemplates using a wider range of materials of differing physical properties such that the fillers 42, 46 and 48 and the plycoats for the ply 38 may each be distinctively different and selected for the desired ride, handling and runflat performance needed. In other words, the designer can selectively tune the materials individually to achieve to desired tire performance

EXAMPLE 1

The following rubber compositions are provided which are intended to exemplary of rubber compositions with properties which can fall within those exemplified in Table 1.

Rubber compositions are prepared and mixed by conventional rubber mixing processes and comprised of the materials shown in Table 2 which represent rubber compositions which may be contemplated for use as fillers 42 and 46 and ply coat(s) for the ply 38. The indicated amounts of materials have been rounded for the illustration of this Example.

TABLE 2

|  | (Parts by Weight) | |
| --- | --- | --- |
| Material | Plycoat | Filler |
| Natural Rubber[1] | 90 | 80 |
| Isoprene/Butadiene Rubber[2] | 10 | 0 |
| Polybutadiene (cis 1,4-) Rubber[3] | 0 | 20 |
| Carbon black | 55 | 55 |
| Silica & Coupler | 6 | 6 |
| Zinc Oxide | 5 | 8 |
| Accelerators (Sulfenamide type) | 4 | 2 |
| Sulfur (insol w/20% oil) | 2 | 4 |

[1]Cis 1,4-polyisoprene type
[2]Copolymer with ratio of isoprene to butadiene of about 1:1
[3]A high cis 1,4 polybutadiene rubber Conventional amounts of rubber processing oil and tall oil fatty acid, collectively about 5 parts with a minimum of 1 part each; antidegradants; tackifying and stiffening resins, primarily of the phenolformaldehyde type in an amount of about 6 phr; and silica and coupling agent therefore; are used with two accelerators for the plycoat sample and one accelerator for the filler rubber composition sample.

The rubber compositions are molded and cured at about 150° C. for about 20 minutes.

In the practice of this invention, it is considered important that the rubber compositions for one or both the fillers 42 and 46 and the ply coat(s) for of the ply 38 are relatively very stiff, moderately hard, and have a low hysteresis.

Further, it is normally desired that the rubber composition for fillers 42 and 46, relative to the rubber composition for plycoats for ply 38 is slightly stiffer, slightly harder and that both of the rubber compositions have a relatively low hysteresis.

It is important to appreciate that the indicated physical properties of the rubber compositions in Table 1 are for samples thereof and that the dimensions, including thickness, of the resulting tire components (fillers and plies) need be taken into account as factors contributing to the overall stiffness and dimensional stability of the tire sidewall and carcass.

It is considered important that the stiffness of the rubber composition for fillers 42 and 46 is somewhat greater than that of the aforesaid ply coat rubber composition because they are not a part of a fabric reinforced ply and further, because it is desired to somewhat maximize their stiffness property.

The hysteresis, or E", and heat buildup values for the rubber composition for the aforesaid fillers is desirably somewhat lower than that for the rubber composition for the aforesaid ply coat(s) because of the bulk of the fillers versus the thin dimensions of the fabric reinforced plies.

Chafing of the tire in the lower bead region radially outward of the carcass structure 30 adjacent the rim flange may be minimized, especially during use of the tire in the uninflated condition, by providing hard rubber chafer portion 60.

In FIG. 6 the same sidewall construction as is shown in FIG. 2B with the exception that the cord reinforcements 52,53 can be replaced by the bead core 26A. The bead core 26A has a radially outer triangular portion than is cantilevered laterally outward of the bead base and extends radially outward above the design rim flange to which the tire 10 is to be mounted. This bead core 26A provides the lower sidewall 20 with lateral stiffness for improved handling while eliminating the need for the cord reinforcements. Alternatively, if additional support is need the combination of reinforcements 52,53 and the bead core 26A can be used.

Figure 7:
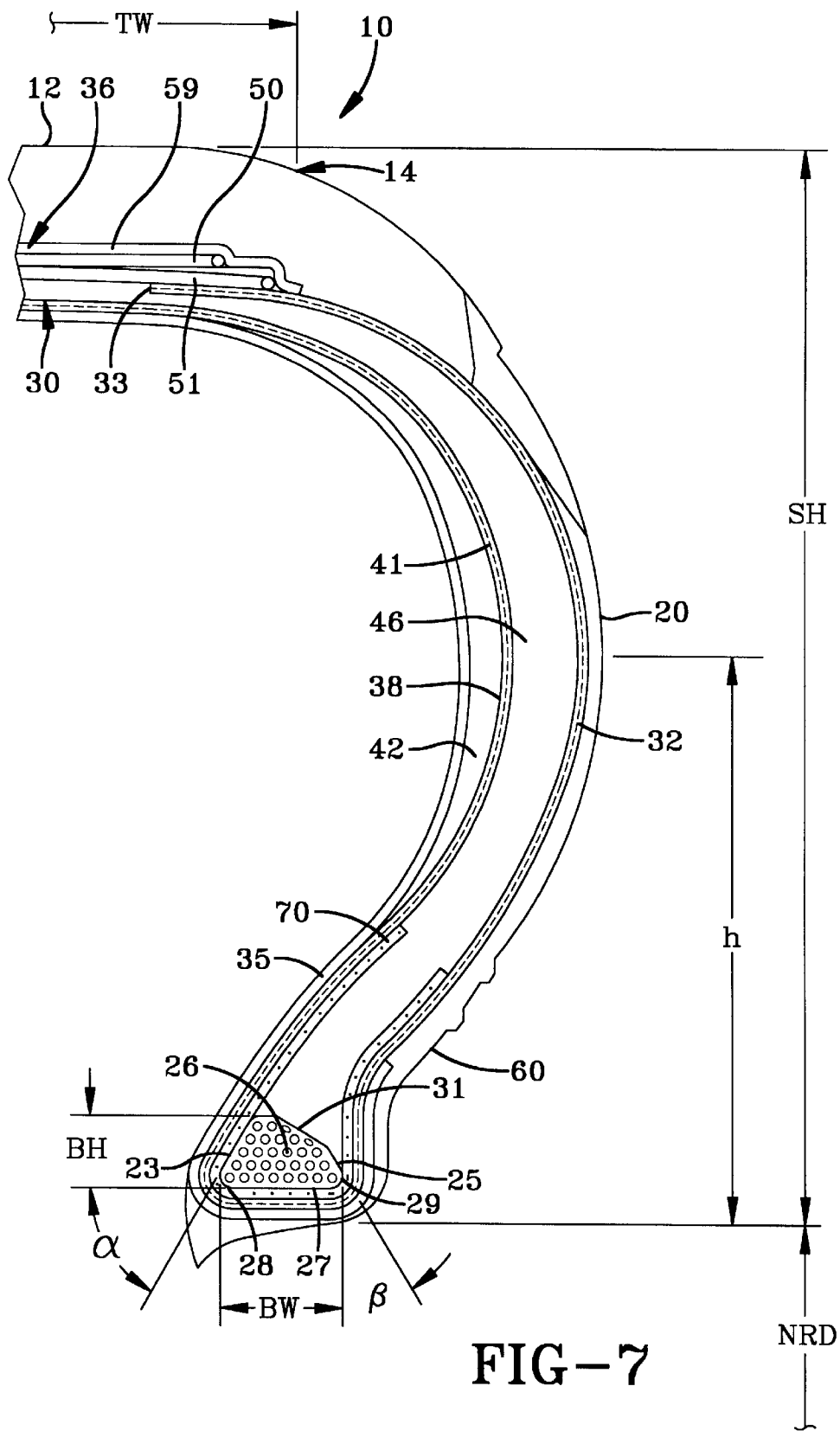
FIG. 7 is an alternative embodiment using a bias cord reinforced structure wrapped about the bead core as shown in the cross-section.

In FIG. 7 the cord reinforcements 52,53 are replaced with a single bias cord reinforced member 70, the member 70 is commonly referred to as a "flipper" which is wrapped about the bead core 26 and extends radially outwardly on each side of the filler 46 to ends radially located a similar distance to the reinforcements 52,53. This single component reduces the number of components shown in FIG. 2B of the preferred second embodiment by one. The flipper 70 is preferably made of cords of the same material described for the reinforcements 52,53 and similar has bias oriented cords oriented preferably at about 45°.

An important feature of all the embodiments shown is that the radially outer ends of the inserts 42,46 should taper in cross-section as they approach the belts and rapidly diminish in cross-sectional thickness to their respective ends, the ends most preferably being staggered and both ending in the range of 5% to 25% of the belt width from the lateral end of the belt structure 36. If the inserts 42, 46 are terminated too soon runflat performance is degraded. If the inserts extend too far inwardly or have too thick a cross-section, rolling resistance is adversely affected. It is therefore most preferred that the ends of the inserts are staggered and terminate within the range of 55 through 15% of the belt width. Additionally, it is also believed important that the end 33 of the turnup end 32 extend at or slightly beyond the end of the insert 46 and that the insert 42 extend under the belt further than either the second insert 46 or the turnup end 32.

The ability of steel cores to survive heat generated by driving without inflation means that the driver can if need be drive the tire beyond the survivability of the elastomers such as the liner. This will render the tire useless for repair but may permit an increase in runflat performance without substantial increase in tire weight or cost.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a tread, a belt structure and a carcass radially inward of the tread and the belt structure, the carcass comprising:
    one ply reinforced with substantially inextensible cords having a minimum modulus E of 10 GPa, the ply having a pair of turnup ends wrapped around a pair of inextensible bead cores, the carcass having a pair of sidewall structures and in each sidewall structure the carcass has a runflat insert radially inward of the ply and an elastomeric bead filler runflat insert radially above each bead core and located between the one ply and the turnup ends, the filler extending from each bead core radially outward in proximity to the belt structure, wherein the turnup ends extend radially outward to a terminal end lying under the belt structure.

2. The tire of claim 1 wherein the cords maintain greater than the minimum modulus and inextensibility at temperatures of about 100° C.

3. The tire of claim 2 wherein the cords of the one ply are steel.

4. The tire of claim 3 wherein each of the cords of the one ply has one or more filaments, each filament has a diameter in the range of 0.10 to 0.30 mm.

5. The tire of claim 4 wherein each filament has a tensile strength of greater than 3,000 MPa.

6. The tire of claim 1 wherein the cords of the one ply are metallic.

7. The tire of claim 1 wherein the cords of the one ply are aramid.

8. The tire of claim 1 wherein the sidewalls have a substantially constant cross-sectional thickness.

9. The tire of claim 1 wherein the bead filler runflat insert is made of a dual blend rubber material.

10. The tire of claim 1 further comprising:
a single bias cord reinforced member which is wrapped about the bead core and extends raidally outwardly on each side of the bead filler.

* * * * *